PHASE-SENSITIVE MODULATOR AND DEMODULATOR UTILIZING A SINGLE TRANSFORMER

Filed March 31, 1966

INVENTOR.
ELDON W. HAWKINS

BY

H. H. Losche

ATT'YS.

United States Patent Office
3,434,075
Patented Mar. 18, 1969

3,434,075
PHASE-SENSITIVE MODULATOR AND DEMODULATOR UTILIZING A SINGLE TRANSFORMER

Eldon W. Hawkins, Indianapolis, Ind., assignor to the United States of America as represented by the Secretary of the Navy Filed Mar. 31, 1966, Ser. No. 540,154
U.S. Cl. 332—43 3 Claims
Int. Cl. H03c 1/54

ABSTRACT OF THE DISCLOSURE

An improved phase sensitive modulator-demodulator circuit requiring only one transformer, and utilizing a pair of PNP-NPN complementary transistors as phase sensitive switches in such manner that the reference voltage may be directly coupled into the circuit without the use of a second transformer inherent in prior art devices. The direction of current flow in the secondary winding of the single input transformer is dependent upon the phase of the reference voltage. Thus the output signal, taken from the center terminal of the transformer secondary winding is phase sensitive with respect to both the input voltage and the reference voltage.

The invention described herein may be manufactured and used by or for the Government of the United States of America for governmental purposes without the payment of any royalties thereon or therefor.

*Background of the invention*

This invention relates particularly to a phase sensitive modulator/demodulator device.

Other devices of this type are known in the art, but for full-wave operation they generally require two (2) transformers; one for the reference signal, and the other one for the input/output signal. United States Patent 2,827,-611, issued to J. W. Beck on March 18, 1958, for a Transistor Demodulator and Modulator, discloses half-wave and full-wave modulating and demodulating devices which are representative of the prior art. That patent shows that two (2) transformers and four (4) transistors are required to accomplish full-wave modulation and demodulation.

*Summary of the invention*

It is to be understood that this invention is an improvement upon the phase sensitive modulator/demodulator art. For simplicity, the device will be referred to only as a phase sensitive demodulator, although further on in the specification the modulator properties will be discussed. An NPN-PNP complementary pair of transistors is utilized in such a fashion that current may flow in either direction through the transistors, depending on the polarity of the emitter-collector bias voltage. By using a pair of switching transistors in this manner, it is possible to control them without the use of a transformer since an alternating reference voltage may be coupled, through a current limiting resistor, to the bases of the transistor pair. This causes the transistors to conduct alternately, thereby giving the device a full-wave capability. The NPN transistor is connected in an inverted relationship; that is, the base current flows through the base to the element which is normally used as the collector. Using the transistor in this way provides for a lower offset voltage and current. When the transistor is "turned on," the collector and emitter act as a closed switch and will pass current in either direction depending on the polarity of the collector-emitter voltage. These same properties apply to the PNP transistor which is also connected in an inverted manner. The transistors act as switches which are opened and closed by the alternating reference voltage. The signal being demodulated is coupled through a transformer having a center-tapped secondary. The center-tap is the output of the demodulator and phase information is obtained by detecting the direction of current flow in the transformer; that is, in or out of the center-tap. The novel connection of the complementary pair of transistors, together with the other circuitry, provides a great improvement to the art, and it is an object of this invention, therefore, to provide an improved phase sensitive modulator/demodulator device.

*Brief description of the drawings*

Other objects, adavntages, uses and novel features of the invention will become apparent from the following detailed description of the invention when considered in conjunction with the accompanying drawing, in which.

*Description of the preferred embodiment*

Figure 1:
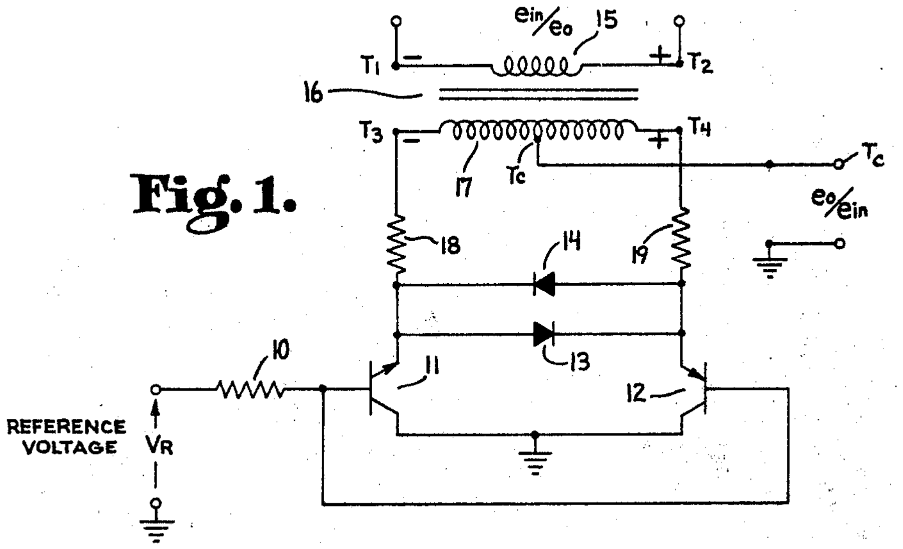
FIGURE 1 is a schematic diagram of one embodiment of the invention where it may be used as either modulator or demodulator.

Referring in particular to FIGURE 1, an alternating reference voltage is applied to a resistor 10 which limits the current in the base circuits of two transistors 11 and 12. The collector electrodes are connected together and coupled to ground or a fixed potential. Coupled between the emitters of transistors 11 and 12 are two diodes 13 and 14 which are connected, with opposing polarities, in parallel with each other. These diodes 13 and 14 limit the voltage difference between the emitters to the forward voltage drop of the diodes. When the device is used as a demodulator the input signal is applied to terminals $T_1$ and $T_2$ of the primary winding 15 of transformer 16. The output is determined by the amplitude and polarity of the signal at the center-tap $T_c$ of the transformer secondary 17. Terminals $T_3$ and $T_4$, of the secondary winding 17, are coupled through resistors 18 and 19 to the emitters of transistors 11 and 12. When the device is to be operated as a demodulator, a suitable capacitor should be coupled between output terminal $T_c$ and ground potential. The voltage developed across this capacitor, between terminals $T_c$ and ground potential, is designated $e_0$, while the input voltage is applied to termials $T_1$ and $T_2$ and is designated $e_{in}$. When the device is operated as a modulator it is not necessary to use the capacitor and the input signal is applied to terminal $T_c$ while the output is taken from terminals $T_1$ and $T_2$.

Figure 2:
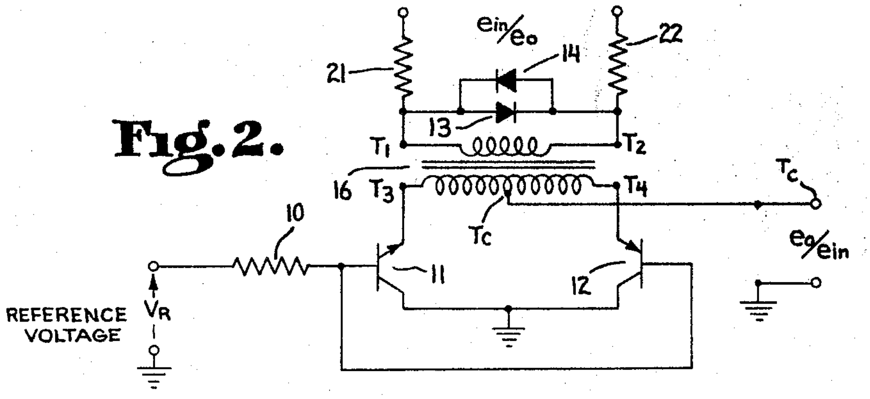
FIGURE 2 shows a schematic of the invention with the voltage limiting diodes in the primary circuit of the transformer.

FIGURE 2 of the drawing shows an embodiment which is similar to that shown in FIGURE 1. The voltage limiting diodes 13 and 14 are placed across the primary winding, however, and resistors 21 and 22 are connected, one from each side of the primary winding, to the input signal.

Figure 3:
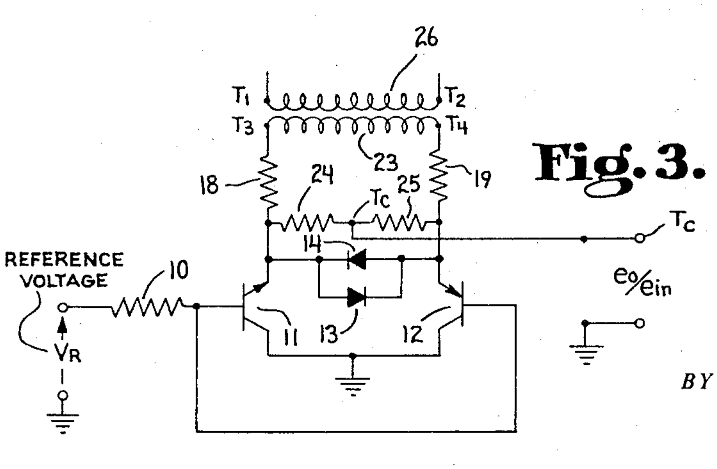
FIGURE 3 shows a schematic of the invention where a resistor arrangement is used to form a center-tap for a control transformer.

FIGURE 3 illustrates an embodiment wherein the transformer 16 is of the specialized form commonly known as a control transformer (CT), as used in servo systems. Here the rotor 23 serves the same function as the secondary 17 of transformer 16 as described with refreence to FIGURES 1 and 2, and the stator winding 26 serves as the primary. The rotor on a CT is not center-tapped, and therefore the resistor arrangement involving resistors 24 and 25 is utilized. These two resistors are connected in series and the combination is placed in parallel with the voltage limiting diodes 13 and 14. An effective center-tap at $T_c$ is created in this way.

The operation of the embodiment shown in FIGURE 1 can best be described with reference to demodulation. The alternating reference voltage $V_R$ applied to resistor 10 "turns on" transistor 11 whenever it is positive and it "turns on" transistor 12 when it is negative. The resistor 10 serves as a simple current limiting device and its value is determined by the amplitude of the reference voltage and the maximum allowable base current to the transistors 11 and 12. Base current in transistor 11 flows through the collector to ground when the transistor is "on." The path for base current in transistor 12 is from ground through the collector to the base. Therefore, no matter what the phase of the input voltage, transistor 11 will be "on" when the reference voltage is positive and transistor 12 will be "on" when the reference voltage goes negative. When the device is operated as a demodulator the center-tap $T_c$ serves as the output. If a capacitor is connected from the output lead $T_c$ to ground, then it is seen that the capacitor will charge to a positive voltage if transistor 11 is on while the transformer 15 is instantaneously polarized as shown. On the next half cycle, assuming the signal voltage and the reference voltage have the same frequency, the capacitor will again charge to a positive value. Therefore, the device acts as a full-wave demodulator. If when the transformer 15 is polarized as shown, transistor 12 is on, then such a capacitor will charge to a negative value. It can now be seen that the device is a full wave phase sensitive demodulator. The resistors 18 and 19 combine with the capacitor to provide the required integrating function for filtering. Although the specific values of resistors 18 and 19 are not critical, the resistor values should be equal. The value selected will depend on the required time constant, ripple reduction, allowable power dissipation, or a combination of the foregoing considerations. The diodes 13 and 14 limit the voltage between the emitters of transistors 11 and 12 so that the "off" transistor is biased off. During the "off" condition of a transistor, if the emitter-to-ground voltage is less than the base-to-ground voltage, the transistor would turn "on." Diodes 13 and 14 provide the required constraint on the emitter-to-ground voltage. In describing the action of the embodiment of FIGURE 1 as a demodulator, reference was made to the use of a capacitor between terminal $T_c$ and ground potential in order to simplify the description. However, the capacitor is not used in the modulator.

When the invention shown in FIGURE 1 is operated as a modulator, the input signal is applied to the terminal $T_c$ and the output is taken from the primary of transformer 16; that is, from terminals $T_1$ and $T_2$. Otherwise, operation is the same as described in the previous paragraph. It is seen in the discussion that the winding connected to terminals $T_1$ and $T_2$ is always referred to as the primary no matter how the transformer operates.

The operation of the device drawn in FIGURE 2 is the same as that described with respect to FIGURE 1, with the exception that the voltage limiting diodes are connected across the primary in FIGURE 2. The turns ratio of the transformer should be appriximately 1:1 in this situation for optimum results. Two resistors 21 and 22 are shown coupled on the primary side for reliability purposes. If a short were to develop on either side of the transformer primary, no effect on the system would be observed.

The device shown in FIGURE 3 operates in the same manner as the device in FIGURE 1 except the transformer is effectively center-tapped by means of the resistor arrangement shown by 24 and 25.

What is claimed is:

1. A phase sensitive modulator and demodulator device having a complementary pair of transistors, comprising:

an NPN switching transistor having a base, an emitter and a collector electrode;

a PNP switching transistor having a base, an emitter and a collector electrode, and having said base electrode coupled to said base electrode of said NPN transistor thereby forming a junction, and said PNP transistor having said collector electrode coupled to said collector electrode of said NPN transistor and also coupled to a point of fixed potential;

a current limiting means having one lead coupled to the junction of said base elements and having the other lead for coupling to a reference signal source;

a transformer means having a primary and a secondary winding, said secondary winding having a center-tap means, and having one end terminal of said secondary winding coupled to said emitter electrode of said NPN switching transistor and the other end terminal coupled to said emitter electrode of said PNP switching transistor; and a voltage limiting means coupled across one of said transformer windings for the purpose of assuring that the non-conducting transistor remains in that condition for a full half-wave of the reference voltage.

2. A phase sensitive modulator and demodulator device having a complementary pair of transistors as described in claim 1, wherein said voltage limiting means is comprised of a first and a second diode each having an anode and a cathode, said diodes coupled in parallel having said anode of first diode coupled to said cathode of said second diode.

3. A phase sensitive modulator and demodulator device having a complementary pair of transistors as described in claim 1, wherein said transformer means is comprised of a control transformer, and said center-tap means is comprised of a pair of resistors connected in series, and this combination of said resistors is coupled in parallel with said transformer secondary, whereby the junction of said resistors provides an effective center-tap of said secondary.

References Cited

UNITED STATES PATENTS

| | | | |
|---|---|---|---|
| 2,827,611 | 3/1958 | Beck | 329—166 X |
| 2,878,384 | 3/1959 | Holmes | 329—103 |
| 3,096,492 | 7/1963 | Vogt. | |
| 3,204,121 | 8/1965 | Riley | 307—234 |

ALFRED L. BRODY, *Primary Examiner.*

U.S. Cl. X.R.

329—103, 110, 50, 166; 307—232, 233, 288, 313; 325—346; 332—16